United States Patent
Jang

(10) Patent No.: US 7,830,550 B2
(45) Date of Patent: Nov. 9, 2010

(54) IMAGE CONVERTING METHOD AND APPARATUS, AND IMAGE FORMING APPARATUS HAVING THE SAME

(75) Inventor: Mi-jung Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 11/746,778

(22) Filed: May 10, 2007

(65) Prior Publication Data

US 2008/0030816 A1    Feb. 7, 2008

(30) Foreign Application Priority Data

Aug. 7, 2006    (KR)    ............ 10-2006-0074274

(51) Int. Cl.
G03F 3/08    (2006.01)
G09G 5/02    (2006.01)

(52) U.S. Cl. .............. 358/1.9; 358/519; 358/520; 358/521; 358/523; 345/601; 345/604

(58) Field of Classification Search ............ None
See application file for complete search history.

(56) References Cited

U.S. PATENT DOCUMENTS

| | | | |
|---|---|---|---|
| 6,574,004 B1* | 6/2003 | Jacob et al. | 358/1.13 |
| 6,982,813 B2* | 1/2006 | Hirata et al. | 358/1.9 |
| 2003/0147554 A1* | 8/2003 | Wei et al. | 382/190 |
| 2004/0072143 A1* | 4/2004 | Timmis et al. | 435/4 |
| 2004/0091137 A1* | 5/2004 | Yoon et al. | 382/118 |
| 2005/0207641 A1 | 9/2005 | Bala et al. | |
| 2006/0082833 A1* | 4/2006 | Shoda et al. | 358/3.26 |

FOREIGN PATENT DOCUMENTS

| | | |
|---|---|---|
| EP | 0281502 | 9/1988 |
| JP | 2002-262108 | 9/2002 |
| JP | 2004-266348 | 9/2004 |
| KR | 1988-1543 | 3/1988 |
| KR | 2000-52226 | 8/2000 |
| KR | 2006-10212 | 2/2006 |

OTHER PUBLICATIONS

Hiroaki Kotera et al.,"Object-to-Object color mapping by image segmntation", Oct. 2001, Journal of Electronic Imaging, vol. 10(4), pp. 977-987.*

Hiroaki Kotera et al., "Object-to-Object mapping by image segmentation", Oct. 2001, "Journal of Electronic Imaging", vol. 10(4)/987, pp. 977-987 (1-11).*

(Continued)

Primary Examiner—Mark K Zimmerman
Assistant Examiner—Haris Sabah
(74) Attorney, Agent, or Firm—Stanzione & Kim, LLP

(57) ABSTRACT

A method of converting a color image into a monochromatic image, includes converting the color image into a color space representing brightness values and attribute values of pixels constituting the color image, converting the color image into the monochromatic image based on the brightness values of the pixels, and modifying brightness values of pixels of the monochromatic image based on eigenvalues corresponding to the attribute values of the pixels of the color image.

28 Claims, 8 Drawing Sheets

OTHER PUBLICATIONS

Chinese Office Action issued Mar. 27, 2009 in CN Application No. 200710136121.9.

European Search Report issued May 13, 2009 in EP Application No. 07110569.6.

Raja Bala, Karen M. Braun "Color-to-grayscale conversion to maintain discriminability" Color Imaging IX: Processing, Hardcopy, and Applications, Proceedings of SPIE-IS&T Electronic Imaging, SPIE, US, vol. 5293, Jan. 20, 2004, pp. 196-202, XP007908249 ISBN: 978-0-8194-5196-5 [retrieved on Feb. 11, 2004] Sections 2, 4 figures 2-4.

Mark Grundland, Neil A. Dodgson: "The decolorize algorithm for contrast enhancing, color to grayscale conversion" Technical Report—University of Cambridge. Computer Laboratory, XX, XX, vol. UCAM-CL-TR-649, Oct. 1, 2005, pp. 1-15, XP002474426 Secion 4: Algorithm.

* cited by examiner

FIG. 5

| | 3f | 6f | 9f | 12f | 15f | 18f | 21f | | 27f | 30f | 33f |
|---|---|---|---|---|---|---|---|---|---|---|---|
| 0 | -4 | -2 | 12 | 10 | 8 | 6 | 4 | 2 | -12 | -10 | -8 | -6 |

IMAGE CONVERTING METHOD AND APPARATUS, AND IMAGE FORMING APPARATUS HAVING THE SAME

CROSS-REFERENCE TO RELATED APPLICATIONS

This application claims priority under 35 U.S.C. §119(a) from Korean Patent Application No. 2006-0074274, filed on Aug. 7, 2006, the disclosure of which is incorporated herein by reference in its entirety.

BACKGROUND OF THE INVENTION

1. Field of the Invention

The present general inventive concept relates to an apparatus and method of converting a color image into a monochromatic image, and more particularly, an apparatus and method of converting different color images into different monochromatic images based on color information, and an image forming apparatus having the same.

2. Description of the Related Art

An image forming apparatus, such as a printer, a multi function peripheral, and the like, forms an image on a print medium, such as a paper or the like, by performing an image process for a printing object, such as a picture or a text. With the development of color imaging techniques, a great deal of documents, including characters, pictures, photographs, and so on, are being currently created in color. Although color image forming apparatuses, such as color printers, color multi function peripherals, and so on, are being popularized, monochromatic image forming apparatus, such as mono printers, mono multifunction peripherals, and so on, are being still used in most offices. Under such circumstances, if a color document is outputted by a monochromatic image forming apparatus, detailed information and meanings included in the color document may be so lost that it is difficult for a viewer to understand the detailed information and meanings when the color document is printer monochromatically.

FIG. 1 illustrates an original color document in the course of an image conversion process, and FIG. 2 illustrates a monochromatic document into which the original color document is converted to according to a conventional image converting method. Referring to FIGS. 1 and 2, according to the conventional image converting method, adjacent objects having different color data in the original color document are converted into a monochromatic image having similar or same brightness data, thereby making it difficult to distinguish among the adjacent objects, particularly, making it impossible to perceive certain particular objects on the monochromatic image. For example, portions a and b, which are in different colors, in the color image illustrated in FIG. 1, are converted to portions a' and b' having the same monochromatic brightness data in FIG. 2.

To overcome this problem, Japanese Patent Publication No. 2002-262108 discloses a method in which different first and second objects are extracted from a color image to be converted into a monochromatic image, the extracted first and second objects are monochromatically converted, and, when drawn positions of the first and second objects are discriminated to be overlapped with each other, a monochromatic gray level difference between the first and second objects after the monochromatic conversion is controlled to be a prescribed difference or over. However, this method requires a great quantity of data, such as data on positions of the adjacent objects, color data, and so on, to be calculated and stored, which results in a great quantity of computation needed and decrease of a speed.

SUMMARY OF THE INVENTION

The general inventive concept provides an image converting method and apparatus with reduced quantity of computation for a conversion process, to convert different color images into different monochromatic images based on color information, and an image forming apparatus using the converting method and apparatus.

The general inventive concept also provides an image converting method and apparatus to convert adjacent objects having different color data in an original color document into a monochromatic image having different brightness data so that all objects can be distinguished from each other on the monochromatic image, and an image forming apparatus using the converting method and apparatus.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept can be achieved by providing a method to convert a color image into a monochromatic image, comprising converting a color image into a color space representing brightness values and attribute values of pixels constituting the color image, converting the color image into the monochromatic image based on the brightness values of the pixels, and modifying brightness values of pixels of the monochromatic image based on eigenvalues corresponding to the attribute values of the pixels of the color image.

The color space representing the brightness values and the attribute values may comprise one of $CIEL^*a^*b^*$, $YCbCr$, and $HSL$.

The brightness values may be represented by luminance.

The attribute values may be represented by hue.

The converting of the color image into the monochromatic image may comprise expressing the monochromatic image with luminance values ranging from 0 to 255.

The modifying of the brightness values of pixels of the monochromatic image may comprise adding and/or subtracting the eigenvalues to/from the brightness values of the pixels of the monochromatic image using at least one table in which the eigenvalues representing unique brightness of the prescribed number of hues are stored.

The number of at least one table is two or more in correspondence to the brightness values represented by the prescribed number of hues.

If a particular hue of the pixels of the color image is not one of the hues stored in the at least one table, an eigenvalue for the particular hue can be calculated in proportion to similarities with two hues most similar to the particular hue among the hues stored in the table.

When the similarities with the two similar hues are a and b, respectively, and their eigenvalues are Va and Vb, respectively, the eigenvalue for the particular hue can be set as $Va^*(a/(a+b))+Vb^*(b/(a+b))$.

Each similarity may be in inverse proportion to a difference between a value of the particular hue and values of the similar hues.

If a particular brightness of the pixels of the color image is not one of the brightnesses stored in the two or more tables, an eigenvalue for the particular brightness is calculated in proportion to similarities with two brightnesses most similar to the particular brightness among the brightnesses stored in the tables.

When the similarities with the two similar brightnesses are c and d, respectively, and their eigenvalues are Vc and Vd, respectively, the eigenvalue for the particular brightness can be set as Vc*(c/(c+d))+Vd*(d/(c+d)).

Each similarity may be in inverse proportion to difference between a value of the particular brightness and a value of the similar brightnesses.

The foregoing and/or other aspects and utilities of the present general inventive concept can also be achieved by providing an image forming apparatus to form an image by converting a color image into a monochromatic image, the image forming apparatus comprising an image converting apparatus to convert a color image into a color space representing brightness values and attribute values of pixels constituting the color image, to convert the color image into the monochromatic image based on the brightness values of the pixels, and to modify brightness values of pixels of the monochromatic image based on eigenvalues corresponding to the attribute values of the pixels of the color image.

The foregoing and/or other aspects and utilities of the present general inventive concept can also be achieved by providing an image converting apparatus to convert a color image into a monochromatic image, comprising a color space converting part to convert the color image into a color space representing brightness values and attribute values of pixels constituting the color image, a monochrome converting part to convert the color image into the monochromatic image based on the brightness values of the pixels, and a monochrome modifying part to modify brightness values of pixels of the monochromatic image based on eigenvalues corresponding to the attribute values of the pixels of the color image.

The color space representing the brightness values and the attribute values may comprise one of CIEL*a*b*, YCbCr, and HSL.

The brightness values can be represented by luminance.

The attribute values can be represented by hue.

The monochrome converting part expresses the monochromatic image with luminance values ranging from 0 to 255.

The monochrome modifying part adds and/or subtracts the eigenvalues to/from the brightness values of the pixels of the monochromatic image using at least one table in which the eigenvalues representing unique brightness of a prescribed number of hues are stored.

The number of at least one table can be two or more in correspondence to the brightness values represented by the prescribed number of hues.

The number of at least one table is one, and if a particular hue of the pixels of the color image is not one of the hues stored in the table, an eigenvalue for the particular hue is calculated in proportion to similarities with two hues most similar to the particular hue among the hues stored in the table.

When the similarities with the two similar hues are a and b, respectively, and their eigenvalues are Va and Vb, respectively, the eigenvalue for the particular hue can be set as Va*(a/(a+b))+Vb*(b/(a+b)).

Each similarity can be in inverse proportion to differences between a value of the particular hue and values of the similar hues.

If a particular brightness of the pixels of the color image is not one of brightnesses stored in the two or more tables, an eigenvalue for the particular brightness is calculated in proportion to similarities with two brightnesses most similar to the particular brightness among the brightnesses stored in the tables.

When the similarities with the two similar brightnesses are c and d, respectively, and their eigenvalues are Vc and Vd, respectively, the eigenvalue for the particular brightness can be set as Vc*(c/(c+d))+Vd*(d/(c+d)).

Each similarity can be in inverse proportion to differences between a value of the particular brightness and value of the similar brightnesses.

The foregoing and/or other aspects and utilities of the present general inventive concept can also be achieved by providing an image forming apparatus comprising an image converting apparatus to convert a color image into a monochromatic image, comprising a color space converting part to convert the color image into a color space representing brightness values and attribute values of pixels constituting the color image, a monochrome converting part to convert the color image into the monochromatic image based on the brightness values of the pixels, and a monochrome modifying part to modify brightness values of pixels of the monochromatic image based on eigenvalues corresponding to the attribute values of the pixels of the color image, and an image forming part to form the monochromatic image converted and modified from the color image by the image converting apparatus, on a printing medium.

The foregoing and/or other aspects and utilities of the present general inventive concept can also be achieved by providing a computer readable recording medium comprising computer readable codes to convert a color image into a monochromatic image, comprising converting the color image into a color space representing brightness values and attribute values of pixels constituting the color image, converting the color image into the monochromatic image based on the brightness values of the pixels, and modifying brightness values of pixels of the monochromatic image based on eigenvalues corresponding to the attribute values of the pixels of the color image.

The foregoing and/or other aspects and utilities of the present general inventive concept can also be achieved by providing a method of converting a color image into a monochromatic image, the method comprising converting a color image into a monochromatic image according to brightness values and eigenvalues corresponding to attributes of the pixels of the color image.

The method of converting the color image may comprise converting the color image into a color space representing the brightness and the attribute values for the pixels of the color image, converting the color image into a monochromatic image based on the brightness values, and modifying the pixels of the monochromatic image based on the attribute values of corresponding pixels of the color image.

The brightness values may be stored in at least one table, and a particular brightness value for a pixel of the color image may be calculated in proportion to similar brightness values stored in the at least one table if the particular brightness value is not stored.

The attribute values may be stored in at least one table, and a particular attribute value for a pixel of the color image may be calculated in proportion to similar attributes stored in the at least one table if the particular attribute is not stored.

The attributes values may be represented by hues.

The foregoing and/or other aspects and utilities of the present general inventive concept can also be achieved by providing an image forming apparatus, comprising an image converting apparatus to convert a color image to a monochromatic image according to brightness values and eigenvalues corresponding to attributes of pixels of the color image.

The image forming apparatus may further comprise an image forming part to form an image corresponding to the monochromatic image.

The image converting apparatus may comprise a color space converting part to convert the color image into a color space representing the brightness values and attribute values of the pixels constituting the color image, a monochrome converting part to convert the color image into the monochromatic image based on the brightness values of the pixels, and a monochrome modifying part to modify brightness values of pixels of the monochromatic image based on the eigenvalues corresponding to the attribute values of the pixels of the color image.

BRIEF DESCRIPTION OF THE DRAWINGS

The above and/or other aspects and advantages of the present general inventive concept will become apparent and more readily appreciated from the following description of the embodiments, taken in conjunction with the accompanying drawings of which:

FIG. 5 is a view illustrating a table used in the image converting method of FIG. 4;

DETAILED DESCRIPTION OF THE PREFERRED EMBODIMENTS

Figure 1:
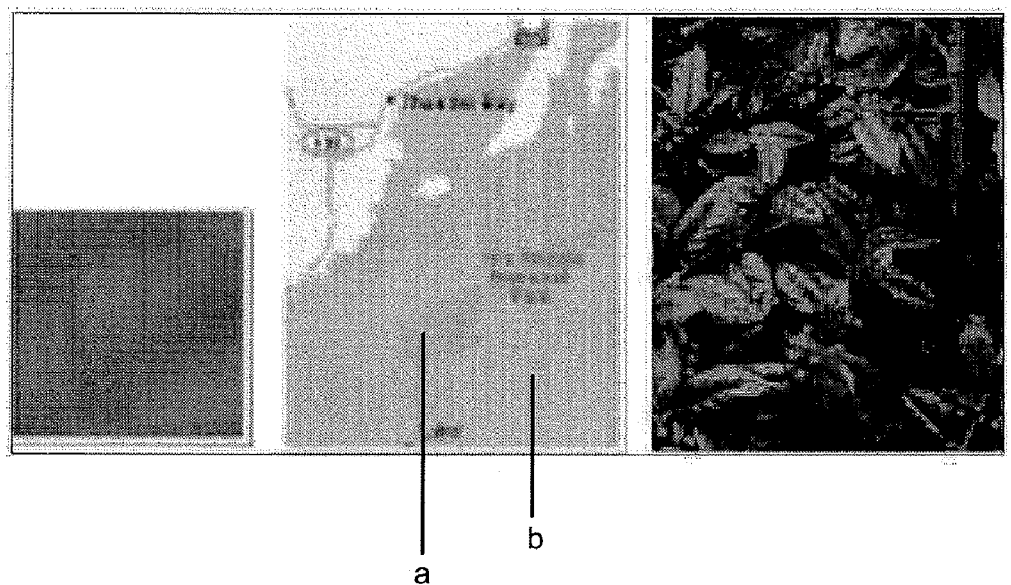
FIG. 1 is a view illustrating an original color document in the course of an image conversion process.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 8:
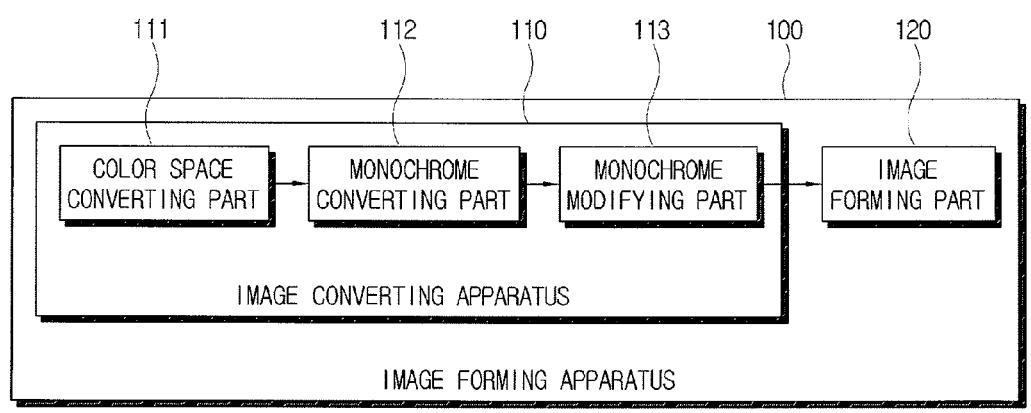
FIG. 8 is a block diagram illustrating configurations of an image forming apparatus and an image converting apparatus according to an exemplary embodiment of the present general inventive concept.

FIG. 8 is a block diagram illustrating a configuration of an image forming apparatus 100 and an image converting apparatus 110 according to an exemplary embodiment of the present general inventive concept. The image forming apparatus 100 may be embodied by a printer, a multi function peripheral, or the like to form an image on a print medium, such as a paper or the like, by performing an image process for a printing object, such as a picture or a text. The image forming apparatus 100 may comprise the image converting apparatus 110 and an image forming part 120, as illustrated in FIG. 8. The image converting apparatus 110 converts a printing object, such as a color image, into a monochromatic image. The image converting apparatus 110 may be embodied by an individual apparatus, such as a computer system. The image forming part 120 performs a printing operation to form the monochromatic image on the printing medium. The image forming part 120 may perform the printing operation using an inkjet method, a laser method, or the like.

As illustrated in FIG. 8, the image converting apparatus 110 may comprise a color space converting part 111 to convert the color image, which is the printing object, into a color space that represents values of brightness and attributes of pixels constituting the color image, a monochrome converting part 112 that converts the color image into the monochromatic image based on the brightness values of the pixels, and a monochrome modifying part 113 that modifies the brightness values of the pixels of the converted monochromatic image based on eigenvalues corresponding to the attribute values of the pixels.

Figure 4:
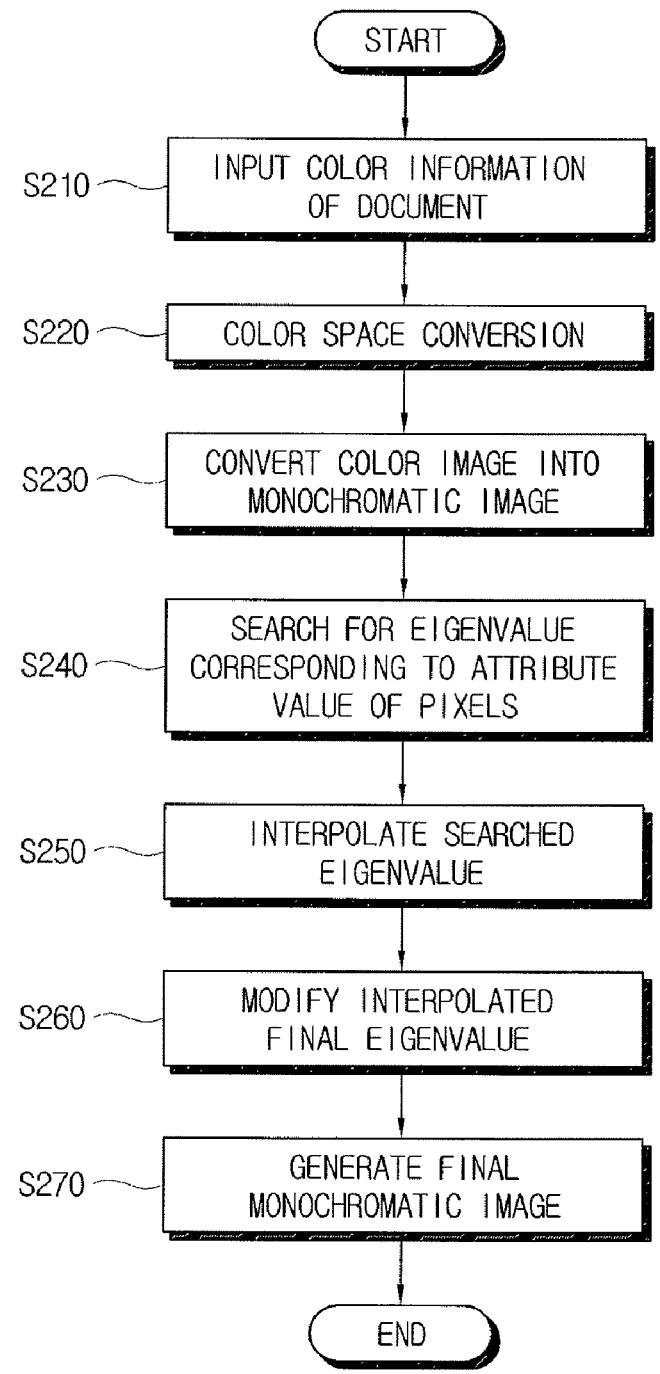
FIG. 4 is a flow chart illustrating the image converting method according to an exemplary embodiment of the present invention.

Now, the image converting apparatus 110 will be described in more detail with reference to FIG. 4. FIG. 4 is a flow chart illustrating an image converting method performed by the image converting apparatus 110 according an the exemplary embodiment of the present general inventive concept.

First, color data of a color document having a color image is inputted in the image converting apparatus 110 at operation S210. If values of red, green, and blue colors of pixels of the color image are expressed with 8 bits, color data of an ordinary document are represented by a color space having values of 0 to 255, which is called an RGB space.

Since the monochromatic image can be represented by only brightness data, the RGB space can be converted into a color space that illustrates brightness information in order to know brightness data of the pixels of the color image at operation S220. Such color space conversion is performed by the color space converting part 111. The color space that illustrates the brightness information may include CIEL*a*b*, YCbCr, HSL, etc (where, Y and L represent the brightness information). The brightness information represented by Y and L can be expressed by luminance. For example, if the monochromatic image can be represented by 8 bits, the brightness information can be expressed by luminance values ranging from 0 to 255, which are also called gray scales.

A method to obtain the brightness information from the RGB space generally uses a NTSC (National Television Standards Committee) system which is represented by an equation, $Y(L)=R*0.2989+G*0.5780+B*0.1140$. For example, if an inputted document includes a color of $(R,G,B)=(255,192,0)$, a gray scale value $(Y(L))=255*0.2989+192*0.5780+0*0.1140=188$.

When the pixels of the color image are represented by the gray scale value of 188, the color image is converted into the monochromatic image at operation S230. This conversion into the monochromatic image is performed by the monochrome converting part 112.

Luminance values of the pixels of the monochromatic image into which the color image is converted by the monochrome converting part 112 are modified by the monochrome modifying part 113 so that different colors may not be converted into the same monochrome.

On the other hand, the image forming apparatus 100 may further comprise a storing part (not illustrated) that stores a table including eigenvalues corresponding to attribute values of colors so that a final monochrome value can be varied depending on inputted color information even if different colors included in an inputted document are converted into the same monochrome. This table, which is called a monochrome enhancement table, may be installed in a print driver of the image forming apparatus 100 or may be embodied by firmware or a chip. One example of the monochrome enhancement table is illustrated in FIG. 5. The monochrome enhancement table has an attribute of color and eigenvalues according to the attribute. The attribute of color may include hue, saturation, etc. In the following description, hue will be considered for the sake of convenience of explanation. The eigenvalues describe how much the monochrome value is modified depending on the attribute of color. The eigenvalues may be expressed by a function with inputted color data as variables or may be set as a constant with +/− sign. In the following description, a constant with +/− sign will be considered for the sake of convenience of explanation.

The monochrome modifying part 113 searches for eigenvalues of the pixels of the monochromatic image using the monochrome enhancement table at operation S240. The eigenvalues are searched for by using the attributes of color. If the attribute of color is hue, the monochrome enhancement table has eigenvalues for the prescribed number of hues. For example, as illustrated in FIG. 5, if the monochrome enhancement table has 12 hues, the eigenvalues for the 12 hues have constants with +/− sign. The eigenvalues set in the monochrome enhancement table may be determined in various ways. For example, although colors of an inputted document have the same brightness, the brightness felt by a user may be varied depending on the hue. For example, Yellow may be felt brighter than Blue, Green may be felt brighter than Magenta, and Cyan may be felt brighter than Red. Using such a characteristic, an order of relative brightness of the 12 hues and variation width of the brightness can be determined, and then, constants with +/− sign are set on the basis of Gray. These set constant with +/− sign are eigenvalues for the hues. In this embodiment, as illustrated in FIG. 5, the maximum eigenvalue is 12 and the minimum eigenvalue is −12, with variation width of the eigenvalue of 24. However, the variation width may be increased to strengthen an extent of variation and may be decreased to weaken the extent of variation.

If a hue value of color is included in the monochrome enhancement table, an eigenvalue for the hue value can be immediately found. However, in most cases, the hue value will not be included in the monochrome enhancement table. If the hue value of color is not one of hue values included in the monochrome enhancement table, an eigenvalue for the hue is calculated in proportion to similarities with two hues most similar to the hue. For example, when the similarities with the two similar hues are a and b, respectively and their eigenvalues are Va and Vb, respectively, the eigenvalue for the hue value not included can be set as Va*(a/(a+b))+Vb*(b/(a+b)). Here, the similarities are in inverse proportion to differences between hue values of the pixels of the color image and values of the two similar hues.

As one example, a process of determining an eigenvalue using the monochrome enhancement table illustrated in FIG. 5 is considered. If the inputted document has includes a color of (R,G,B)=(255,192,0), hue of this color is calculated to be 45° according to the follow known program codes:

```
void RGBtoHSV( float r, float g, float b, float *h, float *s, float *v )
{ float min, max, delta;}
min = MIN( r, g, b ); max = MAX( r, g, b ); *v = max; // v;
delta = max − min;
if( max != 0 ) *s = delta / max; // s else { // r = g = b = 0 // s = 0,
v is undefined *s = 0; *h = −1;
return; }
```

-continued

```
if( r == max ) *h = ( g − b ) / delta; // between yellow & magenta
else if( g == max ) *h = 2 + ( b − r ) / delta; // between cyan &
yellow else *h = 4 + ( r − g ) / delta; // between magenta & cyan;
*h *= 60; // degrees if(*h < 0 ) *h += 360;
```

Where, 45° is not included in the monochrome enhancement table. For example, in the monochrome enhancement table of FIG. 5, hues most similar to 45° are 30° and 60°. The similarities a and b, which are in inverse proportion to differences between the hue values 30° and 60° and the value 45°, may be 1/15 and 1/15, respectively, and the eigenvalues Va and Vb may be −2 and 12, respectively. Thus, an eigenvalue for 45° can be set as −2*(1/15/(1/15+1/15))+12*(1/15/(1/15+1/15))=5. The determined eigenvalue is interpolated by the monochrome modifying part 113 at operation S250 of FIG. 4.

Figure 6:
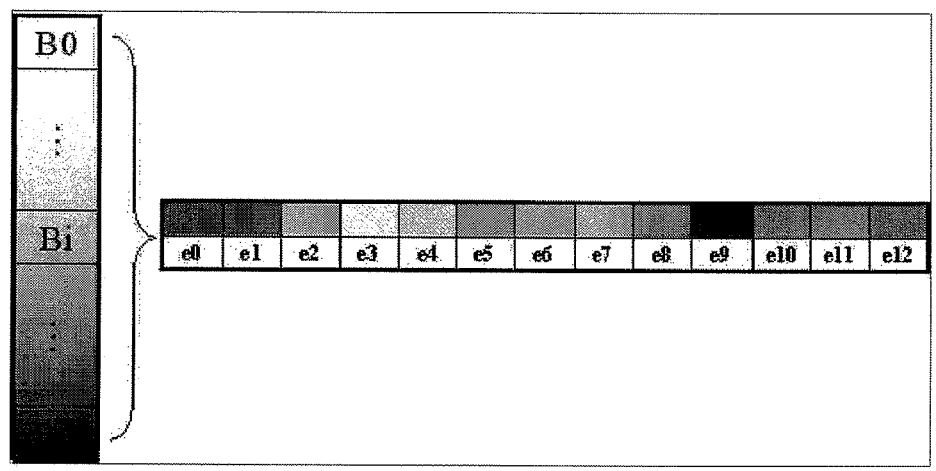
FIG. 6 is a view illustrating a case where the number of tables used in the image converting method of FIG. 4 is one.
Figure 7:
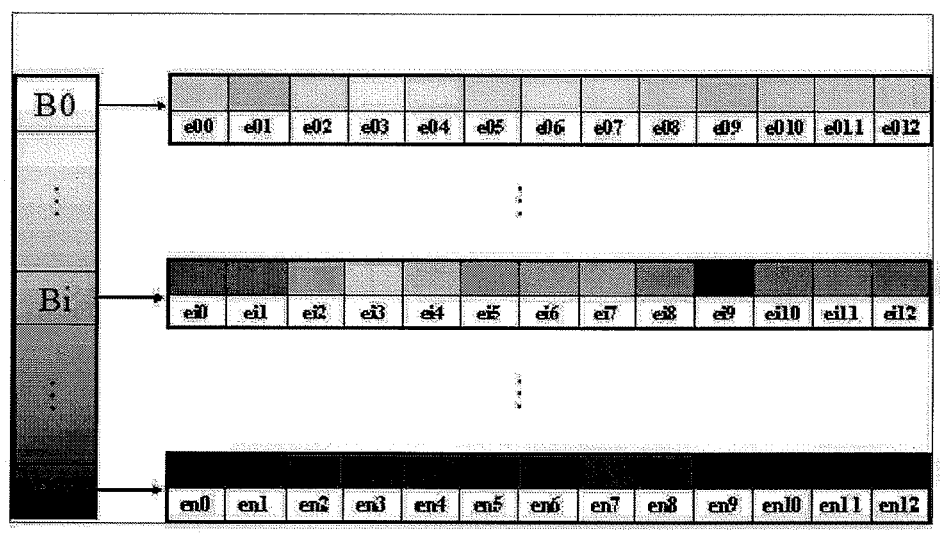
FIG. 7 is a view illustrating a case where the number of tables used in the image converting method of FIG. 4 is two or more.

FIG. 6 is a view illustrating a case where the number of tables used in the image converting method according to the above described embodiment is one, and FIG. 7 is a view illustrating a case where the number of tables used in the image converting method according to the above embodiment is two or more. In FIGS. 6 and 7, the highest brightness value, the lowest brightness value, and any brightness value are defined as B0, Bn, and Bi, respectively, and hue values in each monochrome enhancement table are indicated as e0, e00, ei0, en0, . . . , etc.

While determination of eigenvalues based on only hue of color of the inputted document requires one monochrome enhancement table, as illustrated in FIG. 6, determination of eigenvalues based on both of hue and brightness of color of the inputted document may require two or more monochrome enhancement tables, as illustrated in FIG. 7. Similarly to the hue, if a brightness value of color is not one of brightness values included in the monochrome enhancement table, an eigenvalue for the brightness can be calculated in proportion to similarities with two brightnesses most similar to the brightness not included. For example, when the similarities with the two similar brightnesses are c and d, respectively, and their eigenvalues are Vc and Vd, respectively, eigenvalues for hues of the pixels can be set as Vc*(c/(c+d))+Vd*(d/(c+d)). Here, the similarities are in inverse proportion to differences between brightness values of the pixels of the color image and values of the two similar brightnesses.

Accordingly, if the number of monochrome enhancement tables is two or more, as illustrated in FIG. 7, a monochrome enhancement table corresponding to two brightness values most similar to a brightness value of color of the inputted document can be selected, and then, eigenvalues for two hues most similar to a hue value of color of the inputted document are interpolated in each monochrome enhancement table to determine a final eigenvalue. That is, an interpolation value of four eigenvalues becomes the final eigenvalue. The final eigenvalue is called a GEV (Gray Enhancement Value). A final monochrome value is equal to an addition of brightness values to the final eigenvalue GEV, that is, Gray_Out=Y+GEV=R*0.29289+G*0.5780+B*0.1140+GEV. The interpolated final eigenvalue is modified by the monochrome modifying part 113 at operation S260.

Figure 2:
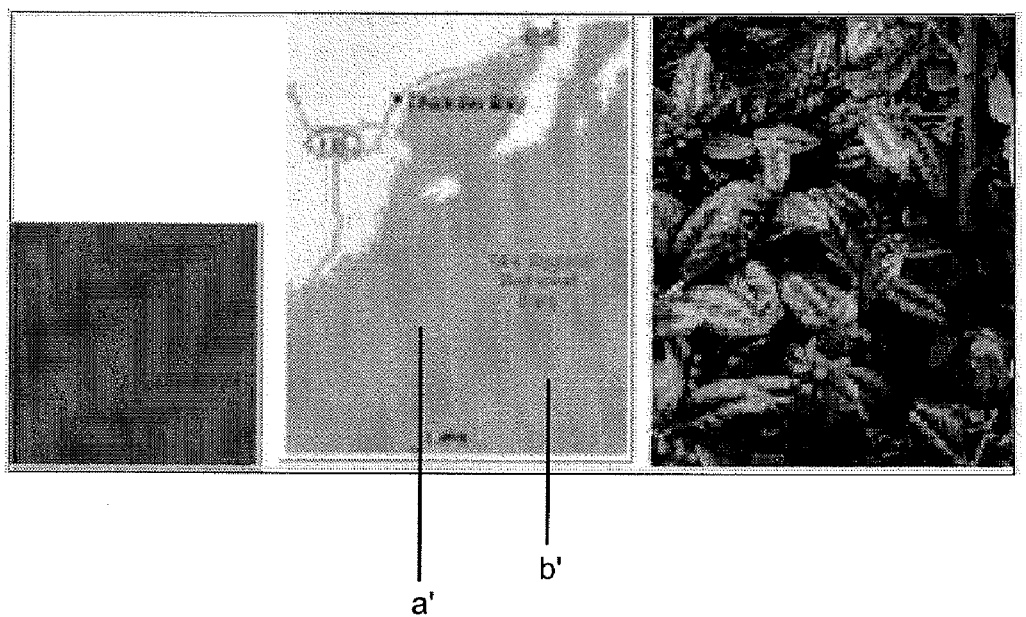
FIG. 2 is a view illustrating a monochromatic document into which an original color document is converted to according to a conventional image converting method.
Figure 3:
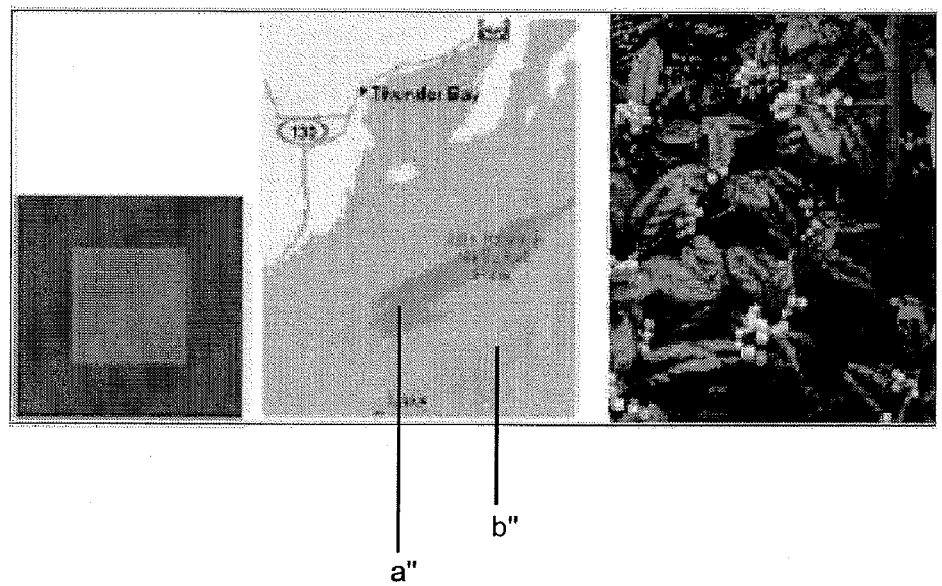
FIG. 3 is a view illustrating a monochromatic document into which an original color document is converted to according to an image converting method according to an exemplary embodiment of the present general inventive concept.

The final monochrome value calculated in this way is used to generate a final monochromatic image at operation S270. FIG. 3 is a view illustrating a monochromatic document into which an original color document is converted according to an image converting method according to an embodiment of the present general inventive concept. Compared to FIG. 2, it can be seen from FIG. 3 that adjacent objects, for example portions a" and b", having different color data in an original color document, for example portions a and b, are converted into a monochromatic image having different brightness data so that all objects can be distinguished from each other on the monochromatic image.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software As apparent from the above description, the present general inventive concept provides an image converting method and apparatus, which is capable of converting adjacent objects having different color data in an original color document into a monochromatic image having different brightness data so that all objects can be distinguished from each other on the monochromatic image, and an image forming apparatus using the converting method and apparatus.

In addition, the present general inventive concept provides an image converting methods and appartus, which is capable of reducing the quantity of computation needed in an image conversion process, and an image forming appartus using the converting method and appartus.

Although a few embodiments of the present general inventive concept have been shown and described, it will be appreciated by those skilled in the art that changes may be made in these embodiments without departing from the principles and spirit of the general inventive concept,the scope of which is defined in the appended claims and their equivalents.

What is claimed is:

1. A method of converting a color image into a monochromatic image in an image converting apparatus, the method comprising:
   converting the color image by a color space converter into a color space representing brightness and attribute values of pixels of the color image;
   converting the color image by a monochromatic image converter into a monochromatic image based on the brightness values; and
   modifying brightness values of the pixels of the monochromatic image by a brightness modifier based on eigenvalues corresponding to the attribute values of corresponding pixels of the color image,
   wherein the modifying of the brightness values of pixels of the monochromatic image comprises adding and/or subtracting the eigenvalues to/from the brightness values of the pixels of the monochromatic image using at least one table in which the eigenvalues representing brightness of a prescribed number of attribute values are stored.

2. The method of claim 1, wherein the color space representing the brightness values and the attribute values comprises one of CIEL*a*b*, YCbCr, and HSL.

3. The method of claim 1, wherein the brightness values are represented by luminance.

4. The method of claim 3, wherein the converting of the color image into the monochromatic image comprises expressing the monochromatic image with luminance values ranging from 0to 255.

5. The method of claim 1, wherein the attribute values are represented by hue.

6. The method of claim 5, wherein, if a particular hue of the pixels of the color image is not one of the hues stored in the table, an eigenvalue for the particular hue is calculated in proportion to similarities with two hues most similar to the particular hue among the hues stored in the table.

7. The method of claim 6, wherein, when the similarities with the two similar hues are a and b, respectively, and their eigenvalues are Va and Vb, respectively, the eigenvalue for the particular hue is Va*(a/(a+b))+Vb*(b/(a+b)).

8. The method of claim 7, wherein each similarity is in inverse proportion to a difference between a value of the particular hue and values of the similar hues.

9. The method of claim 5, wherein the number of at least one table is two or more in correspondence to the brightness values represented by the prescribed number of hues.

10. The method of claim 9, wherein, if a particular brightness of the pixels of the color image is not one of the brightnesses stored in the two or more tables, an eigenvalue for the particular brightness is calculated in proportion to similarities with two brightnesses most similar to the particular brightness among the brightnesses stored in the tables.

11. The method of claim 10, wherein, when the similarities with the two similar brightnesses are c and d, respectively, and their eigenvalues are Vc and Vd, respectively, the eigenvalue for the particular brightness is Vc*(c/(c+d))+Vd*(d/(c+d)).

12. The method of claim 11, wherein each similarity is in inverse proportion to difference between a value of the particular brightness and a value of the similar brightness.

13. An image forming apparatus that to form an image by converting a color image into a monochromatic image, the image forming apparatus comprising:
   an image converting apparatus to convert a color image into a color space representing brightness values and attribute values of pixels constituting the color image, to convert the color image into the monochromatic image based on the brightness values of the pixels, and to modify brightness values of pixels of the monochromatic image based on eigenvalues corresponding to the attribute values of the pixels of the color image.
   wherein the image converting apparatus adds and/or subtracts the eigenvalues to/from the brightness values of the pixels of the monochromatic image using at least one table in which the eigenvalues representing unique brightness of a prescribed number of attribute values are stored.

14. An image converting apparatus to convert a color image into a monochromatic image, comprising:
   a color space converting part to convert the color image into a color space representing brightness values and attribute values of pixels constituting the color image;
   a monochrome converting part to convert the color image into the monochromatic image based on the brightness values of the pixels; and
   a monochrome modifying part to modify brightness values of pixels of the monochromatic image based on eigenvalues corresponding to the attribute values of the pixels of the color image,
   wherein the monochrome modifying part adds and/or subtracts the eigenvalues to/from the brightness values of the pixels of the monochromatic image using at least one table in which the eigenvalues representing unique brightness of a prescribed number of attribute values are stored.

15. The image converting apparatus of claim 14, wherein the color space representing the brightness values and the attribute values comprises one of CIEL*a*b*, YCbCr, and HSL.

16. The image converting apparatus of claim 14, wherein the brightness values are represented by luminance.

17. The image converting apparatus of claim 16, wherein the monochrome converting part expresses the monochromatic image with luminance values ranging from 0 to 255.

18. The image converting apparatus of claim 14, wherein the attribute values are represented by hue.

19. The image converting apparatus of claim 18, wherein, the number of at least one table is one and if a particular hue of the pixels of the color image is not one of the hues stored in the table, an eigenvalue for the particular hue is calculated in proportion to similarities with two hues most similar to the particular hue among the hues stored in the table.

20. The image converting apparatus of claim 19, wherein, when the similarities with the two similar hues are a and b, respectively, and their eigenvalues are Va and Vb, respectively, the eigenvalue for the particular hue is Va*(a/(a+b))+Vb*(b/(a+b)).

21. The image converting apparatus of claim 20, wherein each similarity is in inverse proportion to differences between a value of the particular hue and a value of the similar hue.

22. The image converting apparatus of claim 18, wherein the number of at least one table is two or more in correspondence to the brightness values represented by the prescribed number of hues.

23. The image converting apparatus of claim 19, wherein, if a particular brightness of the pixels of the color image is not one of brightnesses stored in the two or more tables, an eigenvalue for the particular brightness is calculated in proportion to similarities with two brightnesses most similar to the particular brightness among the brightnesses stored in the tables.

24. The image converting apparatus of claim 23, wherein, when the similarities with the two similar brightnesses are c and d, respectively, and their eigenvalues are Vc and Vd, respectively, the eigenvalue for the particular brightness is Vc*(c/(c+d))+Vd*(d/(c+d)).

25. The image converting apparatus of claim 24, wherein each similarity is in inverse proportion to differences between a value of the particular brightness and a value of the similar brightness.

26. An image forming apparatus comprising:
an image converting apparatus to convert a color image into a monochromatic image, comprising:
a color space converting part to convert the color image into a color space representing brightness values and attribute values of pixels constituting the color image,
a monochrome converting part to convert the color image into the monochromatic image based on the brightness values of the pixels, and
a monochrome modifying part to modify brightness values of pixels of the monochromatic image based on eigenvalues corresponding to the attribute values of the pixels of the color image; and
an image forming part to form the monochromatic image converted and modified from the color image by the image converting apparatus, on a printing medium,
wherein the monochrome modifying part adds and/or subtracts the eigenvalues to/from the brightness values of the pixels of the monochromatic image using at least one table in which the eigenvalues representing unique brightness of a prescribed number of attribute values are stored.

27. An image forming apparatus, comprising:
an image converting apparatus to convert a color image to a monochromatic image according to brightness values and eigenvalues corresponding to attributes of pixels of the color image;
wherein the image converting apparatus comprises:
an image forming part to form an image corresponding to the monochromatic image,
a color space converting part to convert the color image into a color space representing the brightness values and attribute values of the pixels constituting the color image,
a monochrome converting part to convert the color image into the monochromatic image based on the brightness values of the pixels, and
a monochrome modifying part to modify brightness values of pixels of the monochromatic image based on the eigenvalues corresponding to the attribute values of the pixels of the color image,
wherein the monochrome modifying part adds and/or subtracts the eigenvalues to/from the brightness values of the pixels of the monochromatic image using at least one table in which the eigenvalues representing unique brightness of a prescribed number of attribute values are stored.

28. A method of converting a color image into a monochromatic image in an image converting apparatus, the method comprising:
adjusting brightness values of pixels of the monochromatic image by a brightness adjustor according to eigenvalues corresponding to color attribute values of the pixels,
wherein the adjusting of the brightness values of pixels of the monochromatic image comprises adding and/or subtracting the eigenvalues to/from the brightness values of the pixels of the monochromatic image using at least one table in which the eigenvalues representing brightness of a prescribed number of attribute values are stored.

* * * * *